United States Patent
Knee et al.

(10) Patent No.: US 6,895,049 B1
(45) Date of Patent: May 17, 2005

(54) ANALYSIS OF COMPRESSION DECODED VIDEO IMAGE SEQUENCES

(75) Inventors: Michael James Knee, Petersfield (GB); Ian James Poole, Petersfield (GB)

(73) Assignee: Snell & Wilcox Limited, St. Margaret's (GB)

( * ) Notice: Subject to any disclaimer, the term of this patent is extended or adjusted under 35 U.S.C. 154(b) by 0 days.

(21) Appl. No.: 09/806,967

(22) PCT Filed: Oct. 11, 1999

(86) PCT No.: PCT/GB99/03359

§ 371 (c)(1),
(2), (4) Date: Apr. 6, 2001

(87) PCT Pub. No.: WO00/22831

PCT Pub. Date: Apr. 20, 2000

(30) Foreign Application Priority Data

Oct. 9, 1998 (GB) .............................. 9822092

(51) Int. Cl.[7] .................................................. H04N 7/12
(52) U.S. Cl. .................................................. 375/240.03
(58) Field of Search .................... 375/240.02–240.07, 375/240.12, 240.14, 240.15, 240.18, 240.2, 240.24, 240.22; 382/232, 239, 250, 251; H04N 7/12

(56) References Cited

U.S. PATENT DOCUMENTS

| | | | |
|---|---|---|---|
| 5,086,488 A | * | 2/1992 | Kato et al. .................. 382/239 |
| 5,142,380 A | * | 8/1992 | Sakagami et al. .......... 382/251 |
| 5,249,053 A | * | 9/1993 | Jain ........................ 375/240.2 |
| 5,438,625 A | | 8/1995 | Klippel |
| 5,512,956 A | | 4/1996 | Yan |
| 5,629,779 A | * | 5/1997 | Jeon ........................ 375/240.2 |
| 5,642,115 A | * | 6/1997 | Chen ........................ 382/232 |
| 5,671,298 A | | 9/1997 | Markandey et al. |
| 5,748,245 A | * | 5/1998 | Shimizu et al. ........ 375/240.03 |
| 5,802,218 A | | 9/1998 | Brailean |
| 5,812,197 A | | 9/1998 | Chan et al. |
| 5,831,688 A | * | 11/1998 | Yamada et al. ......... 375/240.18 |
| 5,930,398 A | * | 7/1999 | Watney ....................... 382/250 |
| 5,991,456 A | | 11/1999 | Rahman et al. |
| 6,005,952 A | | 12/1999 | Klippel |
| 6,151,362 A | | 11/2000 | Wang |
| 6,163,573 A | * | 12/2000 | Mihara ................... 375/240.03 |
| 6,269,120 B1 | | 7/2001 | Boice et al. |
| 6,278,735 B1 | | 8/2001 | Mohsenian |
| 6,285,716 B1 | | 9/2001 | Knee et al. |
| 6,437,827 B1 | | 8/2002 | Baudouin |
| 6,539,120 B1 | | 3/2003 | Sita et al. |
| 6,570,922 B1 | | 5/2003 | Wang et al. |
| 2001/0031009 A1 | | 10/2001 | Knee et al. |
| 2002/0118760 A1 | * | 8/2002 | Knee et al. ............. 375/240.22 |

FOREIGN PATENT DOCUMENTS

| | | |
|---|---|---|
| EP | 0509576 | 10/1992 |
| EP | 0710030 | 5/1996 |
| WO | WO 98/26602 | 6/1998 |

OTHER PUBLICATIONS

Murata et al; "Fast 2D IDCT Implementation with Multimedia Instructions for a Software MPEG2 Decoder", Proceedings of the 1998 IEEE Int. Conf. on Acoustics, Speech and Signal Processing, vol. 5, May 12, 1998, pp. 3105–3108.

* cited by examiner

Primary Examiner—Richard Lee
(74) Attorney, Agent, or Firm—Michael Best & Friedrich LLP

(57) ABSTRACT

A method of detecting I-frames in a video signal which has previously been MPEG coded, involves taking a DCT and analyzing the frequency of zero value coefficients. An I-frame, which does not utilize prediction coding is expected to have a higher number of zero coefficients than a predicted P- or B-frame.

6 Claims, 2 Drawing Sheets

ANALYSIS OF COMPRESSION DECODED VIDEO IMAGE SEQUENCES

FIELD OF THE INVENTION

This invention relates to the analysis of compression decoded sequences and in the most important example to the analysis of video signals that have been decoded from an MPEG bitstream.

BACKGROUND OF THE INVENTION

It is now understood that processes such as re-encoding of a video signal can be significantly improved with knowledge of at least some of the coding decisions used in the original encoding.

Proposals have been made for making some or all of these coding decisions available explicitly. Examples of these proposals can be seen in previous patent applications [see EP 0 765 576 and EP 0 913 058]. These methods involve the use of an Information Bus which passes MPEG coding parameters from a decoder to a subsequent re-coder.

However, in certain situations, no such explicit information is available, and the only available information is that contained in the decoded video signal.

It will be well understood that in the MPEG-2 video compression standard, there are different categories of frames which differ in the degree to which their frames are coded using prediction, and that these categories are denoted by I-, P- and B-frames respectively. An important coding decision to be taken into consideration in a re-encoding process is accordingly the frame structure in terms of the I-, P- and B-frames.

SUMMARY OF THE INVENTION

Accordingly, it is an object of the invention to determine by analysis of the video signal, information concerning the upstream coding and decoding process that is useful in minimizing degradation of picture quality in a subsequent, downstream coding and decoding process.

A further object of the present invention is to derive information from a decoded video signal concerning the categories of frames employed in the encoding process. It is a further object of this invention to assist in maintaining picture quality when cascading compression decoding and coding processes.

Accordingly the present invention consists in a method of analysing a signal derived in coding and decoding processes which utilise a quantisation process having a set of quantisation values in which the coded signal contains categories of frames which categories differ in the degree to which their frames are coded using prediction, the method comprising the steps of measuring the occurrence of values in the signal corresponding with the set of possible quantisation values, and inferring the category of a specific frame by testing the occurrence of said values against a threshold.

BRIEF DESCRIPTION OF THE DRAWINGS

The invention will now be described by way of example in reference to the accompanying drawings, in which.

DETAILED DESCRIPTION

Figure 1:
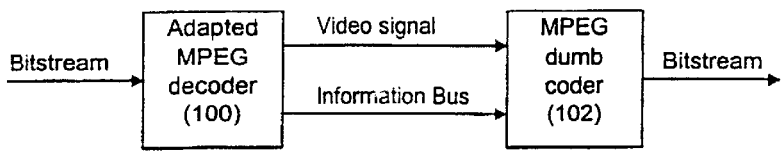
FIG. 1 is a block diagram illustrating the use of an Information Bus as in the prior art.

Referring initially to FIG. 1, the MPEG decoder (100), adapted as shown in the above prior references, receives an MPEG bitstream. In addition to the output of a standard MPEG decoder, this adapted decoder then produces an Information Bus output conveying the coding decisions taken in the upstream encoder, which are of course inherent in the MPEG bitstream. The Information Bus is then passed to the dumb coder (102) along with the video signal. This dumb coder then follows the coding decisions made by the upstream coder (not shown) which are conveyed by the Information Bus.

This invention is related to the situation in which the adapted MPEG decoder cannot be used to produce the Information Bus because the MPEG bitstream has already been decoded by a standard decoder and the input bitstream is no longer available. The aim is to try to estimate as many as possible of the MPEG coding parameters by analysing the decoded video signal.

When the Information Bus is used, transparent cascading is only possible when all the relevant parameters at sequence, GOP, picture, slice and macroblock rate are carried. Clearly, it is not possible to estimate all these parameters from a decoded picture alone. However, a proportion of the benefit of the Information Bus can be obtained even if the only information carried from decoder to coder relates to the picture type (I-, P- or B-frame). In this case, the 'dumb' coder of FIG. 1 becomes a full MPEG coder except that it sets the picture type to that received in the Information Bus.

Figure 2:
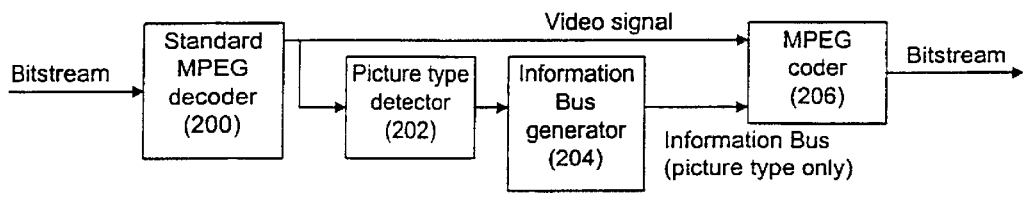
FIG. 2 is a block diagram showing one embodiment of the present invention.

The purpose of the present invention is to estimate the picture type by analysing the decoded video signal. Such an estimate would be used as shown in FIG. 2. In this embodiment, the standard MPEG decoder (200) receives the bitstream input, and decodes it, producing the usual video signal output. This is then passed to the MPEG coder (206), and also to the picture type detector (202). The information from the picture type detector is then passed to an Information Bus generator (204). The Information Bus then generated, relating to picture type only, is then passed to the MPEG coder. This then follows the coding information available in the Information Bus in coding the video signal, producing an output bitstream.

The following description concentrates on one particular aspect of the picture type detector, the detection of I-frames. In this embodiment, the coding processes referred to are those of MPEG-2, in which the different categories of frames which differ in the degree to which they are coded using prediction are the picture types I, P, and B. The I-frames are coded with no prediction; the P-frames with only forward prediction and the B-frames with both forward and backward prediction.

The invention relies on the observation that intra coded blocks in MPEG-2 are the direct output of an inverse DCT function, whereas predicted macroblocks are the result of an inverse DCT function added to a prediction. If we take the forward DCT of a picture that has been decoded from an MPEG-2 bitstream, then we would expect the DCT coefficients of intra blocks to take only values that were in the set of quantizer reconstruction levels specified in the MPEG-2 standard. The DCT coefficients of predicted blocks might occasionally exhibit this property, but this would only be fortuitous. Unfortunately, without knowledge of the quantizer step size and weighting matrix used in the original encoder, the only quantizer reconstruction level that we know to exist is zero. However, because the distribution of DCT coefficients (even for intra blocks) is highly peaked around zero, we can still expect a large number of DCT coefficients of intra blocks to be equal to zero.

If we count the number of zero DCT coefficients in each frame, we would expect a high number to indicate either that the frame is an I-frame and contains only intra blocks, or is a predicted frame in which a very high proportion of the blocks are intra coded. In either case, it would be acceptable to judge such a frame as an I-frame for the purposes of optimizing the performance of the re-coding step. One slight complication is that, for luminance blocks, there are two options for every macroblock for the input to the DCT process; dct_type can be either frame based or field based. This problem can be avoided by simply taking both kinds of DCT in parallel and including both in the count, accepting the fact that there will be a 2:1 'dilution' of the result. While chrominance blocks do not have this problem in Main Profile MPEG coding, they are not used in the preferred form of the invention because of the ambiguities involved in transcoding between the 4:2:0 and 4:2:2 formats.

Figure 3:
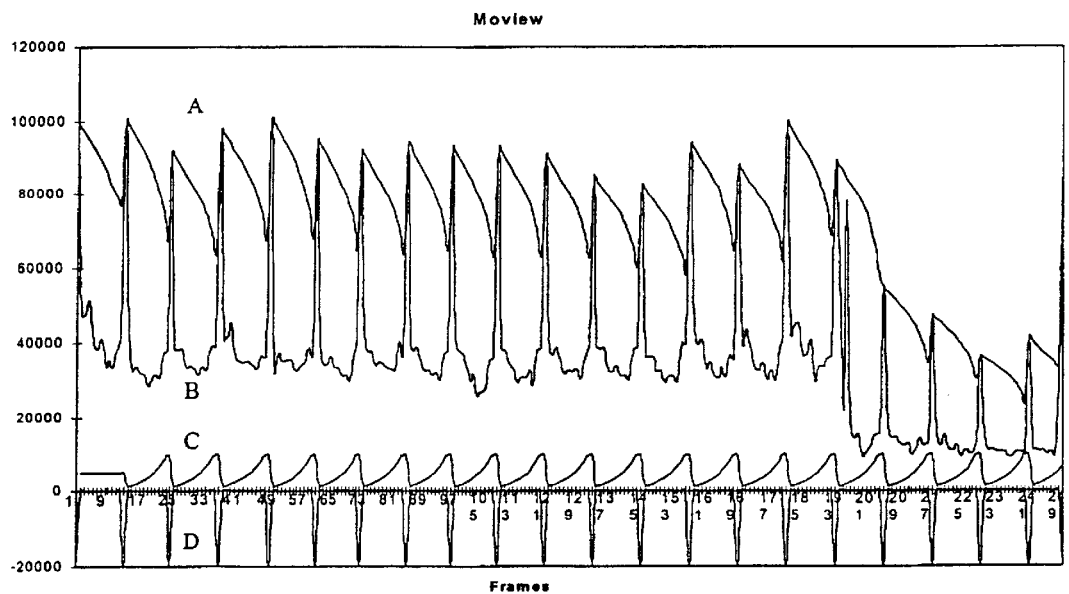
FIG. 3 is a graph illustrating the operation of one embodiment of the present invention.

FIG. 3 illustrates aspects of this particular embodiment of the invention. Graph B in FIG. 3 shows the number of zero coefficients encountered for each frame in a typical sequence in which the first and every 12th subsequent frame is an I-frame.

Clear peaks can be seen which indeed correspond to the existence of I-frames. In principle, we should be able to apply a threshold to the curve in order to detect I-frames. However, as the graph illustrates, a simple fixed threshold will not always work. The sequence has a change in scene content around frame 190, and this leads to a drop both in the counts of zero coefficients for I-frames and in the 'background count' for other frames. Some kind of adaptive threshold filter is therefore required. There now follows an example showing how the threshold could be adapted.

The filter sets an initial threshold which is then modified once per frame. If the zero-coefficent count (ZCC) exceeds the threshold, then an I-frame is deemed to have been detected and the threshold is reset to the ZCC value; otherwise the threshold is decreased by a factor, known here as the Threshold Modifier Factor (TMF):

$$T_n = (T_{n-1} * TMF + V_n)/TMF + 1$$

where $T_n$ is the threshold at frame $n_1$ and $V_n$ is the ZCC value at time n.

It can be seen that if the incoming ZCC data is constant, then the threshold will tend to that constant.

The TMF is determined using a confidence test. The confidence test looks at the position of the last I-frame found and the number of frames between the last two detected I-frames, and assumes that the I-frames are occurring at regular intervals. If there were no frames between the last two detected I-frames, then we assume that a false I-frame was detected, so the confidence is set to 0.5 until another I-frame is found; otherwise the confidence is determined as:

Confidence=exp((CurrentFramePosition−ExpectedIFramePosition))/5

The confidence is clipped to the range 0 (no peak expected) to 1 (peak expected).

The TMF is determined as:

TMF=Max−Confidence*(Max−Min)

where Min and Max are the minimum and maximum values the TMF is allowed to take.

It can be seen that the greater the confidence, the smaller the TMF, hence the more rapidly the threshold decreases until an I-frame is detected.

The above description is simply an example; other systems of adaptive thresholding could equally be used.

A refinement to the detection method could be to make an explicit and separate detection of scene changes and incorporate this into the confidence measure. This could be augmented by a priori knowledge of the strategy adopted by the original encoder to modify or reset the GOP structure at scene changes.

The performance of the complete detection method is illustrated in FIG. 3, where the four curves show: the threshold, graph A, the zero-coefficient count (ZCC) value, graph B, the confidence value, graph C, and the result—a downward pointing spike indicating that an I-frame has been detected—graph D.

A further particular aspect of the picture type detector involves the detection of all the different categories of frames which make up the frame structure in the video signal and not merely the I-frames. The method here is similar to that employed in detecting the I-frames. In general, a particular P-frame is not necessarily noticeably more intra-coded than a particular B-frame, but if the analysis is performed as for the detection of I-frames, and an average of the results over a large number of frames is taken, it is found that the P-frames are, on average, slightly more intra-coded than the B-frames. This result can be used to determine the particular frame structure which was used in the original encoding.

Given a specific number of non-I-frames between two I-frames, there are only a few different types of frame structure which are used in conventional encoders. For example, given an I-frame every sixth frame, the structure will typically be I, B, B, P, B, B, I or I, B, P, B, P, B, I. The changes, if at all, between frames structures in a given signal are also reasonably infrequent, allowing a large possible sample from which an average can be taken. If an average of the results of an analysis as above are taken, the subtle trends in the numbers of zero coefficients found for the different types of predicted frame can be used, along with the knowledge that there are only a certain known number of different frame structures available, to deduce the frame structure which was used in encoding the given signal. This information can be used alongside information regarding the position of the I-frames to give more detailed information to the MPEG coder (as in FIG. 2, (206)) via the Information Bus.

Figure 4:
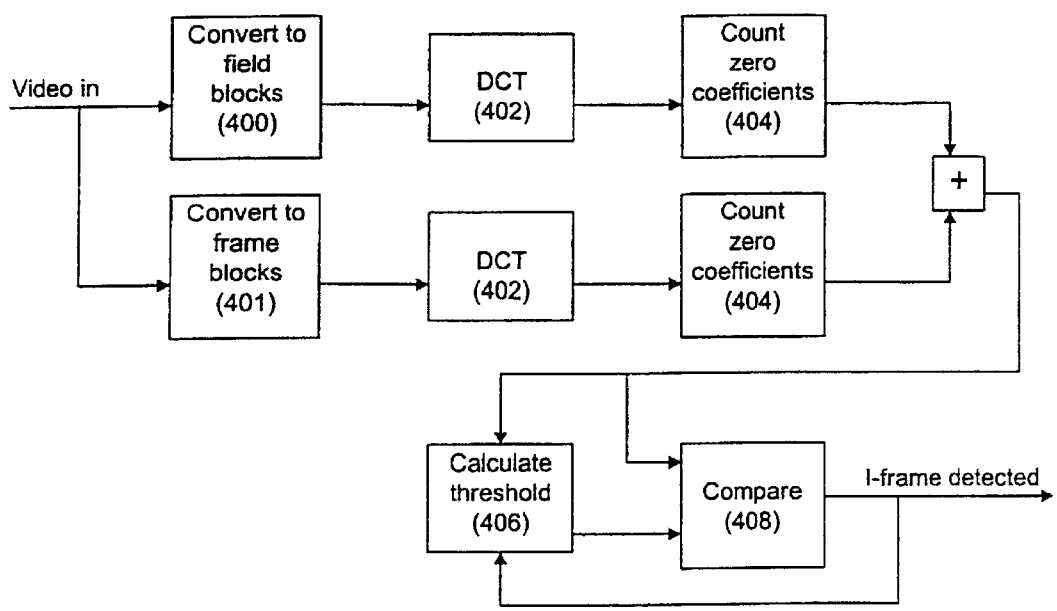
FIG. 4 is a block diagram illustrating in more detail a specific part of the apparatus of the FIG. 2 embodiment.

FIG. 4 gives a block diagram of an I-frame detector using the method described above. The video signal is first converted to field blocks (400) and frame blocks (401). The signal from each of these is then passed first through a DCT (402), and the zero coefficients for the signal are then counted (404). The two signals are then added and the combined zero coefficient count is compared at 408 with a threshold. An I-frame is detected if the threshold is exceeded. The threshold is calculated at 406 utilising, as described above, information from the combined zero coefficient count and the location of the last detected I-frame.

It will be understood that this invention has been described by way of example only, and a wide variety of modification is possible without departing from the scope of the invention.

Thus, whilst the described counting of zero coefficients has the advantage of not requiring prior knowledge of the full set of possible quantisation values, there will be circumstances in which it will be appropriate to measure the occurrence of other values. Also, although the example of MPEG-2 is of course very important, the invention is also applicable to other coding schemes which utilise categories of frames which differ in the degree to which frames are coded using prediction.

What is claimed is:

1. A method of analysing a signal which has previously been coded and decoded, said previous coding utilising a quantisation process having a set of possible quantisation values and in which the coded signal contained categories of frames, which categories differ in the degree to which frames were coded using prediction, the method comprising the steps of measuring the occurrence in the signal of those values which correspond with the set of possible quantisation values, and inferring the category of a specific frame by testing the occurrence of said values against a threshold.

2. A method according to claim 1, in which said threshold is varied in accordance with an expected pattern of said categories of frames in the coded signal.

3. A method according to claim 2, in which said threshold varies with the number of frames since detection in the decoded signal of a particular category of frame.

4. A method according to claim 3, in which said particular category of frame contains those frames which are coded with no prediction.

5. A method according to claim 1, in which the occurrence of zero values is measured.

6. A method according to claim 1, in which coding and decoding processes utilise frame types I, P and B; in which I frames are coded with no prediction, P frames are coded with only forward prediction and B frames are coded with both forward and backward prediction.

* * * * *